H. C. WHITE.
SAFETY GUARD FOR SPRING SEATS.
APPLICATION FILED JAN. 11, 1917.

1,258,609.

Patented Mar. 5, 1918.

WITNESSES:
Charles Pehles
Thos Castberg

INVENTOR
Harold C. White
BY Strong & Townsend
ATTORNEYS

UNITED STATES PATENT OFFICE.

HAROLD C. WHITE, OF STOCKTON, CALIFORNIA, ASSIGNOR TO THE HOLT MANUFACTURING COMPANY, A CORPORATION OF CALIFORNIA.

SAFETY-GUARD FOR SPRING-SEATS.

1,258,609.  Specification of Letters Patent.  Patented Mar. 5, 1918.

Application filed January 11, 1917. Serial No. 141,780.

*To all whom it may concern:*

Be it known that I, HAROLD C. WHITE, a citizen of the United States, residing at Stockton, in the county of San Joaquin and State of California, have invented new and useful Improvements in Safety-Guards for Spring-Seats, of which the following is a specification.

This invention relates to a safety guard for spring seats, such as are employed in connection with traction engines, mowing machines, and other farming machinery; the object being to provide a simple, practical guard against the driver being thrown from his seat in traveling over rough ground.

Having reference to the accompanying drawings—

Figure 1:
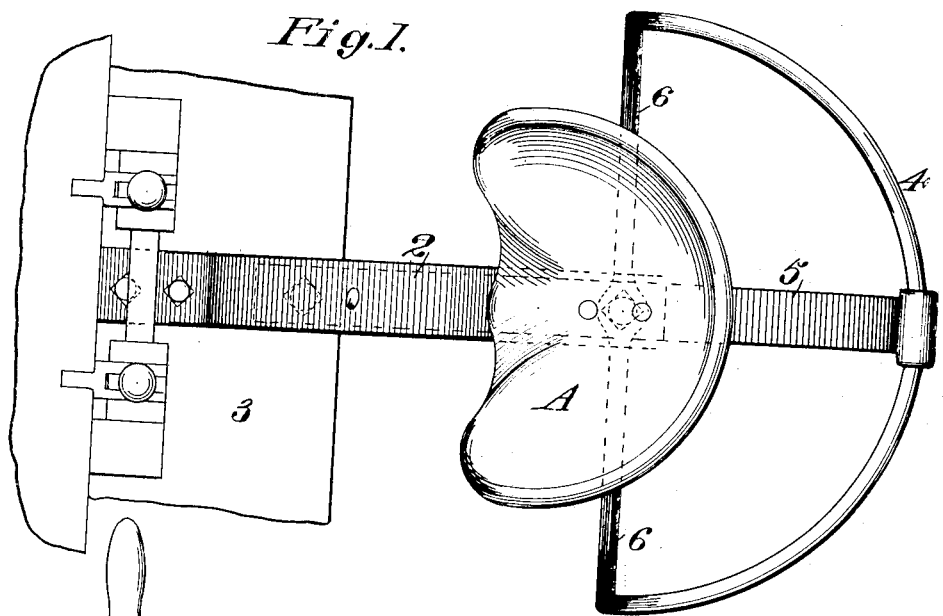
Figure 1 is a plan view illustrating the invention.
Figure 2:
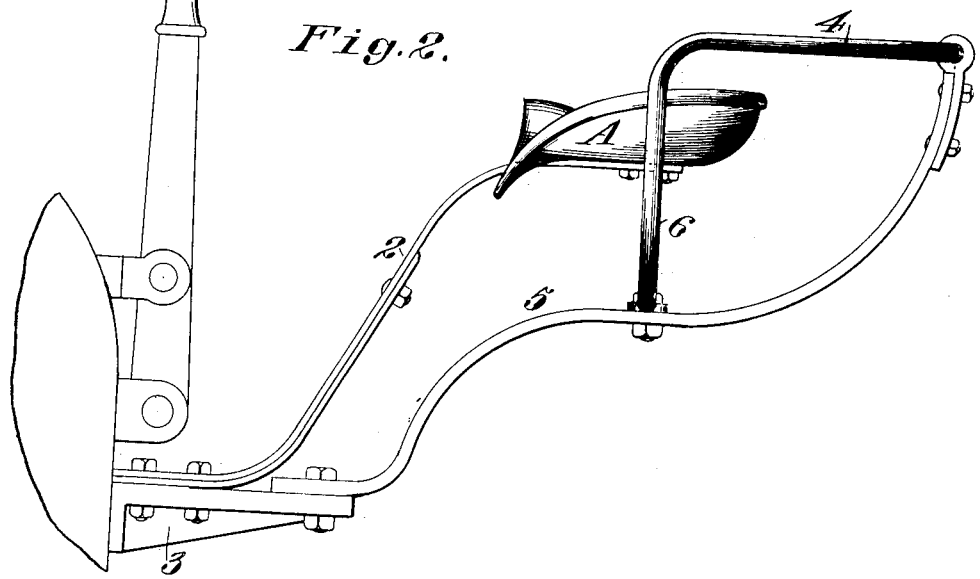
Fig. 2 is a side elevation of the same.

The seat A is the regular type having a spring standard 2, suitably connected to the engine or vehicle frame 3. The invention lies in making and applying a rigid guard as 4, surrounding the seat A, but out of contact therewith, and independently supported from the vehicle frame by appropriate means, as the bracket 5. The guard member 4 is semi-circular in plan, and is so positioned at the side and back of the seat and extends sufficiently above the latter as always to provide a substantial railing partly embracing the driver; the upright standards 6 being of sufficient height and the disposition of the bracket 5 being sufficiently low so that the guard does not in any wise interfere with the regular spring movements of the seat so necessary for comfortable riding.

The guard 4 and its bracket 5 are not supposed to have any spring, but are stationary relative to the seat, and so constructed and arranged as to prevent the driver from either falling or being thrown over backward, or sidewise from his seat.

Having thus described my invention, what I claim and desire to secure by Letters Patent is—

1. In combination, a frame, a spring seat mounted thereon, a curved guard behind said seat, a curved guard below said seat, and a brace connecting the center of each guard with the frame.

2. A guard for vehicle seats of the type in which the seat is resiliently supported by a spring attached to the vehicle frame, consisting of a circular ring bent centrally at a right angle, and means for maintaining such right angular position and for holding said guard in fixed relation to said frame and providing entire freedom at both sides of said spring.

3. In combination, a frame, a seat, a spring supporting said seat on said frame, an arc-shaped guard above and approximately parallel to the rim of said seat, a second arc-shaped guard below the bottom of said seat and approximately parallel thereto, an arc-shaped brace behind and approximately parallel to the back of said seat and connecting said guards, and means for connecting said brace with the frame.

In testimony whereof I have hereunto set my hand in the presence of two subscribing witnesses.

HAROLD C. WHITE.

Witnesses:
 FRANK H. CHISHOLM,
 W. P. FERGUSSON.